United States Patent [19]

Kempermann et al.

[11] 3,816,323

[45] June 11, 1974

[54] PROCESS FOR THE VULCANIZATION OF NATURAL OR SYNTHETIC RUBBER

[75] Inventors: Theo Kempermann, Cologne-Lindenthal; Ulrich Eholzer, Cologne, both of Germany

[73] Assignees: Bayer Aktiengesellschaft, Leverkusen; Deutsche Gold- und Silber-Scheideanstalt vormals Roessler, Frankfurt, both of, Germany

[22] Filed: Feb. 23, 1972

[21] Appl. No.: 228,726

[30] Foreign Application Priority Data
Feb. 26, 1971  Germany............................ 2109244

[52] U.S. Cl. ............. 252/182, 260/2 N, 260/2 EC, 260/79 B, 260/785
[51] Int. Cl......................... C08c 11/54, C08c 11/56
[58] Field of Search........... 258/182; 260/785, 79 B, 260/2 N, 2 EC

[56] References Cited
UNITED STATES PATENTS

| | | | |
|---|---|---|---|
| 3,491,069 | 1/1970 | Brooks et al. | 260/785 |
| 3,544,492 | 12/1970 | Taylor et al. | 260/785 |
| 3,630,940 | 12/1972 | Leshin | 260/785 |
| 3,686,132 | 8/1972 | Sagawa et al. | 260/785 |

*Primary Examiner*—Leland A. Sebastian
*Assistant Examiner*—Irwin Gluck
*Attorney, Agent, or Firm*—Connolly and Hutz

[57] ABSTRACT

This invention relates to a process for the vulcanization of rubbers produced from halogen-free dienes in the presence of sulphur and/or sulphur donors and a combination of vulcanization accelerators consisting of derivatives of 1,3,5-triazine disulphide, an accelerator of the mercapto group containing type and optionally an accelerator of the thiuram accelerator. By using this combination the disadvantage of a long heating time when using the 1,3,5-triazine disulphide alone will be obviate without reducing the high moduli.

7 Claims, No Drawings

PROCESS FOR THE VULCANIZATION OF NATURAL OR SYNTHETIC RUBBER

This invention relates to a process for the vulcanization of natural or synthetic rubbers produced from halogen-free dienes in the presence of sulphur and/or sulphur donors and in particular vulcanization accelerators for such a process.

It is known to use derivatives of 1,3,5-triazine which are represented by the general formula (I) below as vulcanization accelerators for the vulcanization with sulphur of diene rubbers (Dutch Offenlegungsschrift No. 6,803,363 (1968)).

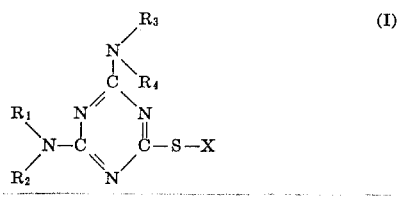

In the general formula (I),
$R_1$ and $R_2$ denote hydrogen, alkyl or alkenyl radicals, cycloalkyl or aralkyl radicals which may be substituted by OH, OR or CN groups,
$R_3$ and $R_4$ denote alkyl, alkenyl, cycloalkyl, aryl and aralkyl radicals which may be substituted by OH, OR or CN groups and
X denotes a hydrogen atom or a radical represented by the following general formula (II)

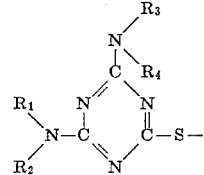

or—S—$R_5$ wherein $R_5$ denotes an alkyl, aryl, aralkyl or benzothiazyl radical or

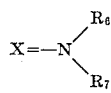

wherein $R_6$ denotes hydrogen atom, an alkyl, aralkyl or cycloalkyl radical and $R_7$ denotes an alkyl, aralkyl or cycloalkyl radical; the radicals $R_6$ and $R_7$ may also form a ring which may contain a hetero atom.

A particularly effective vulcanization accelerator is bis-(2-ethylamino-4-diethylamino-triazin-6-yl) disulphide, hereinafter referred to as A; this accelerator gives rise to vulcanizates which have high moduli even when it is used only in small doses (see Example 1) and it has a high resistance to reversion.

The derivatives of 1,3,5-triazine represented by the general formula (I) and especially the compound A, have, however, one disadvantage when used as the sole accelerators. Because they only cause a slow vulcanization they require a long heating time, and their flow time/heating time ratio is therefore unfavourable.

It is also known that when mercapto accelerators such as dibenzothiazyl disulphide (MBTS), 2-mercaptobenzthiazole (MBT) and the zinc salt of 2-mercaptobenzothiazole are used as the sole accelerators they produce products which have relatively low moduli (see S. Bostrom, Kautschuk-Handbuch, Volume 4, pages 300 – 307 f, Stuttgart, 1961). This is especially so if only small doses of sulphur are used (about 0.6 to 1.5 phr sulphur) as is the case in so-called "efficient" and "semi efficient" vulcanization systems for the production of heat resistant vulcanizates (see Example 4 in which dibenzothiazyl disulphide results in only a low moduli when the amount of sulphur provided is 1.2 phr). The above mentioned accelerators of the mercapto group containing type of accelerators are not very effective and must therefore be used in relatively large doses, especially when only small quantities of sulphur are used.

It was an object of the invention to develop a vulcanization accelerator mixture which would obviate the disadvantage of the long heating time without reducing the high moduli.

The problem has been solved by using a mixture of special accelerators for vulcanization.

This invention therefore relates to a process for the vulcanization of natural and/or synthetic rubbers produced from halogen-free dienes in the presence of sulphur and/or sulphur donors and vulcanization accelerators, characterised in that a mixture of
a. 1,3,5-triazine disulphides having the general formula (III)

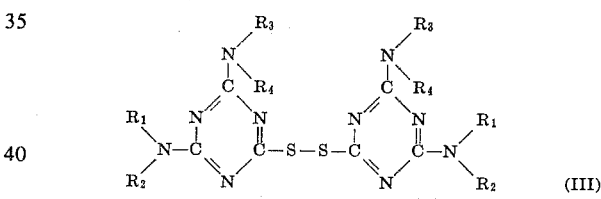

in which one of the four radicals
$R_1$ and $R_4$ denotes a hydrogen atom and the three remaining radicals, which may be the same or different, denote straight chain or branched chain alkyl groups containing 1 to 4 carbon atoms,
b. a vulcanization accelerator of the mercapto group containing type and optionally
c. a vulcanization accelerator of the thiuram accelerator type is used as vulcanization accelerator.

This invention relates also to mixtures of the vulcanization accelerators and to mixtures composed of the accelerators and natural and synthetic rubbers produced from halogen-free dienes.

The vulcanization accelerator preferably used is a mixture consisting of bis-(2-ethylamino-4-diethylamino-triazin-6-yl) disulphide (Group a), dibenzothiazyldisulphide (Group b) and optionally tetramethylthiuram disulphide (Group c).

The following are given as other examples of suitable compounds of the general formula (III):
Bis-(2-methylamino-4-dimethylamino-triazin-6-yl) disulphide,
bis-(2-n-propylamino-4-di-n-propylamino-triazin-6-yl) disulphide, bis-(2-iso-propylamino-4-di-isopropylamino-triazin-6-yl) disulphide,
bis-(2-n-butylamino-4-di-n-butylamino-triazin-6-yl) disulphide,
bis-(2-iso-butylamino-4-di-isobutylamino-triazin-6-yl) disulphide,
bis-(2-methylamino-4-diethylamino-triazin-6-yl) disulphide,
bis-(2-methylamino-4-di-n-propylamino-triazin-6-yl) disulphide,
bis-(2-methylamino-4-di-isopropylamino-triazin-6-yl) disulphide,
bis-(2-methylamino-4-di-n-butylamino-triazin-6-yl) disulphide,
bis-(2-methylamino-4-di-iso-butylamino-triazin-6-yl) disulphide,
bis-(2-ethylamino-4-dimethylamino-triazin-6-yl) disulphide,
bis-(2-ethylamino-4-di-n-propylamino-triazin-6-yl) disulphide,
bis-(2-ethylamino-4-di-isopropylamino-triazin-6-yl) disulphide,
bis-(2-ethylamino-4-di-n-butylamino-triazin-6-yl) disulphide,
bis-(2-ethylamino-4-di-iso-butylamino-triazin-6-yl) disulphide,
bis-(2-n-propyl-4-dimethylamino-triazin-6-yl) disulphide,
bis-(2-n-propyl-4-diethylamino-triazin-6-yl) disulphide,
bis-(2-n-propyl-4-diisopropylamino-triazin-6-yl) disulphide,
bis-(2-n-propyl-4-di-n-butylamino-triazin-6-yl) disulphide,
bis-(2-n-propyl-4-di-iso-butylamino-triazin-6-yl) disulphide,
bis-(2-isopropyl-dimethylamino-triazin-6-yl) disulphide,
bis-(2-isopropyl-diethylamino-triazin-6-yl) disulphide,
bis-(2-isopropyl-di-n-propylamino-triazin-6-yl) disulphide,
bis-(2-isopropyl-di-n-butylamino-triazin-6yl) disulphide,
bis-(2-isopropyl-di-isobutylamino-triazin-6-yl) disulphide,
bis-(2-n-butylamino-4-dimethylamino-triazin-6-yl) disulphide,
bis-(2-n-butylamino-4-diethylamino-triazin-6-yl) disulphide,
bis-(2-n-butylamino-4-di-n-propylamino-triazin-6-yl) disulphide,
bis-(2-n-butylamino-4-di-iso-propylamino-triazin-6-yl) disulphide,
bis-(2-n-butylamino-4-di-isobutylamino-triazin-6-yl) disulphide,
bis-(2-isobutylamino-4-dimethylamino-triazin-6-yl) disulphide,
bis-(2-isobutylamino-4-diethylamino-triazin-6-yl) disulphide,
bis-(2-isobutylamino-4-di-n-propylamino-triazin-6-yl) disulphide,
bis-(2-isobutylamino-4-di-isopropylamino-triazin-6-yl) disulphide,
bis-(2-isobutylamino-4-di-n-butylamino-triazin-6-yl) disulphide, The following are given as examples of vulcanization accelerators from the group of mercapto group containing accelerators (Group b): 2-Mercaptobenzothiazole (MBT), the zinc salt of 2-mercaptobenzothiazole and dibenzothiazyl disulphide. The preferred mercapto accelerator is benzothiazyl disulphide (MBT-S).

The following are examples of vulcanization accelerators from the group of thiuram accelerators (Group c) which may optionally be included:

Tetraethylthiuram disulphide (TETD), tetramethylthiuram monosulphide (TMTM), dimethyldiphenylthiuram disulphide and tetramethylthiuram disulphide. Tetramethylthiuram disulphide (TMTD) is preferred.

With the process according to the invention, it is possible to obviate the great disadvantage of the relatively long heating time needed when using triazine accelerators by replacing a part of the triazine compound by a vulcanization accelerator from the group of mercapto accelerators. Dibenzothiazyl disulphide (MBTS) is particularly suitable for this purpose and has the most pronounced effect in reducing the vulcanisation time. 2-Mercapto-benzothiazole (MBT) and the zinc salt of 2-mercaptobenzothiazole also reduce the heating time of triazine accelerators although to a slightly less extent than dibenzothiazyldisulphide. The great advantage of triazine accelerators of producing high moduli even when added in low doses is not impaired by the combination according to the invention. They achieve high moduli even at small doses with only short heating times and therefore operate very economically.

The individual components a, b and c of the accelerator combinations according to the invention may advantageously be used in the following quantities (in parts by weight based on 100.0 parts by weight of rubber):

| | |
|---|---|
| Triazine accelerator approximately | 0.02 to 5, preferably 0.05 to 3 |
| mercapto group containing accelerator approx. | 0.05 to 5, preferably 0.1 to 4 |
| thiuram accelerator | 0 to 4, preferably 0 to 2. |

The quantity of sulphur required is about 0.2 to about 4 parts by weight. Sulphur donors such as N,N'-dithio-bis-morpholine, dipentamethylenethiuram tetrasulphide, N,N'-dithio-bis-hexahydro-2H-azepinone-(2) or 2-benzothiazyl-dithio-N-morpholide may also be used.

The process according to the invention is suitable for the vulcanization of natural and/or synthetic rubbers obtained from halogen-free dienes; the following are given as examples:

Natural rubber (NR), styrene-butadiene rubber (SBR), nitrile rubber (NBR), polybutadiene (BR), polyisoprene (IR) and transpolypentenamer (Trans-PA) (see Kautschuk und Gummi, Kunststoffe 23, 502 et seq; 1970, Verlag fur Radio, Photo und Kinotechnik, Berlin).

Mixtures of various diene rubbers may also be used.

The individual components of the accelerator system may be added to the diene rubbers or rubber mixtures before vulcanization, either separately or in the form of a mixture or in the form of a rubber-accelerator premix (see Ullmann's Encyklopadie der technischen Chemie, 3rd Edition, Publishers Urban und Schwarzenberg, Munchen-Berlin 1957, Volume 9, page 364).

The diene rubbers may contain all the usual additives such as fillers, particularly carbon black, silicas, mineral oils, plasticizers, adhesifying agents, accelerator activators, especially stearic acid, waxes, age resistors, ozone resisters, anti-oxidants, antiozonants, blowing agents, dyes and pigments.

Vulcanization of the diene rubbers is generally carried out at temperatures of between about 100°C and about 300°C, preferably at 120°C to 240°C. Any of the usual vulcanization processes of the art may be employed, such as press heating, heating with superheated steam, hot air, salt bath, fluidised bed, ultrahigh frequency or steam tube.

Example 1 illustrates the high activity of the triazine accelerator bis-(2-ethylamino-4-diethylamino-triazin-6-yl) disulphide which when supplied in a dose of only 0.3 phr results in practically the same modulus-maximum as that obtained with 0.5 phr of N-cyclohexyl-benzothiazole-2-sulphenamide (CBS) but requires a longer heating time ($t_{90}$).

The effectiveness of the accelerator combination according to the invention in natural rubber is illustrated in Example 2. Triazine accelerator A used alone (Mixture 3) results in a high modulus but requires a relatively long heating time. Dibenzothiazyl disulphide (MBTS) used alone (Mixture 1) in the same amount (0.5 phr) is substantially less effective as regards the stress value and results in only 68 percent of the maximum modulus obtained with A (0.5 phr) but its heating time is slightly shorter. It is surprisingly found that the combination of 0.25 phr of A and 0.25 phr of dibenzothiazyl disulphide (Mixture 2) has a shorter heating time than dibenzothiazyl disulphide alone and above all, it requires only 60 percent of the heating time of A alone. The decisive advantage of triazine accelerator A, namely the high degree of cross-linking, is preserved in the combination, as is evident from the modulus-maximum. The combination according to the invention is substantially superior in all respects to pure dibenzothiazyl disulphide (MBTS).

Accelerator combinations frequently used in practice for the sulphur vulcanization of diene rubbers consist of mercapto group(s) containing accelerators such as 2-mercapto-benzothiazole (MBT) or dibenzothiazyl disulphide (MBTS) and diphenyl guanidine (DPG) (see S. Bostrom, Kautschuk-Handbuch, Volume 4, Stuttgart 1961, p. 300 – 304 and p. 320 – 321). The superiority of the combinations according to the invention of A with MBTS (Mixture 2) or A with MBT (Mixture 5) over the conventional combination of MBTS and DPG (Mixture 7) quoted for comparison is clear from Example 2. When using the same total quantities of accelerators (0.5 phr in each case), the accelerator combinations (Mixture 2 and Mixture 5) provide distinctly higher modulus-maxima, better resistance to premature vulcanization and better tensile strength of the vulcanizates at the same or slightly shorter heating vulcanization times than Mixture 7 which consists of MBTS and DPG.

Example 3 illustrates the superiority of the combination according to the invention of triazine accelerator A with dibenzothiazyl disulphide and the additional accelerator tetramethylthiuram disulphide (Mixture 9) over a conventional combination of dibenzothiazyl disulphide and diphenyl guanidine (Mixture 8). The accelerator combination according to the invention (Mixture 9) consists of a total of only 0.4 phr of accelerator as compared with a total of 1.0 phr of accelerator in Mixture 8 and yet the combination according to the invention is superior in all respects, provides better resistance to premature vulcanization, higher modulus maximum and shorter vulcanization time.

Example 4 illustrates the efficiency of the combination according to the invention of dibenzothiazyl disulphide and triazine accelerator A (Mixture 11) compared with vulcanization accelerator dibenzothiazyl disulphide used alone (Mixture 10) and A used alone (Mixture 12), using in each case the same total quantity of accelerator with only a low dose of sulphur (1.2 phr of sulphur) as is suitable for the production of heat resistant vulcanizates.

With this low dose of sulphur, dibenzothiazyl disulphide (Mixture 10) provides only a low modulus. The combination according to the invention (Mixture 11) provides a substantially higher modulus than dibenzothiazyl disulphide and practically the same modulus as triazine accelerator A used alone but with a shorter heating time than the latter.

Example 5 illustrates the high efficiency of the combination according to the invention when used in styrene butadiene rubber. The accelerator used here for comparison is N-cyclohexyl-benzothiazyl-2-sulphenamide (CBS) supplied at a dose of 1.0 phr. The combination, which contains a total of only 0.47 phr of accelerator, produces the same maximum of modulus at practically the same heating time as that with more than twice that quantity of CBS.

The data given in the examples which follow were obtained as follows:

Rubber mixtures were prepared in an internal mixer by the usual method from the test formulations shown in Table 1. Sulphur and vulcanization accelerator were subsequently added on mixing rolls. Test slabs 4 mm in thickness were produced from the mixtures by press vulcanization (stepwise heating at the temperatures indicated in the examples). The individual data were obtained by the test methods shown in Table 2.

The vulcanizates according to the invention are used for the production of technical articles, for example footwear, tubes, seals, conveyor belts, tyres and profiles.

Table 1

| Components of mixture (phr) | Test formulations | |
|---|---|---|
| | No. 1 Examples 1 – 4 | No. 2 Example 5 |
| Smoked sheets RSS No. 1 | 100.0 | — |
| Styrene-butadiene rubber | — | 100.0 |
| High abrasion furnace black (N 330,HAF) | 45.0 | 45.0 |
| Zinc oxide | 5.0 | 5.0 |
| Aromatic mineral oil (VDK = 0.950) | 4.0 | 4.0 |
| Naphthenic mineral oil (VDK = 0.882) | — | 4.0 |

Table 1—Continued

| | Test formulations | |
|---|---|---|
| Components of mixture (phr) | No. 1 Examples 1 – 4 | No. 2 Example 5 |
| Stearic acid | 3.0 | 1.5 |
| Phenyl-β-naphthylamine | 0.75 | 0.5 |
| N-phenyl-N'-isopropyl-p-phenylenediamine | 1.5 | 1.5 |
| Sulphur | 1.2 or 2.35 +) | 1.8 |
| Accelerator | as indicated in the Examples | |

+) Examples 1 – 3: in each case 2.35 phr of sulphur;
Example 4: 1.2 phr of sulphur

Table 2

| Test methods and abbreviations | |
|---|---|
| 1) Scorch time | By analogy with the Mooney scorch time (see DIN 53 524) obtained from the stress value/heating time curve. Rise of the stress value at 300% elongation by 20 points above the minimum (step-wise heating) |
| 2) M 300 | Modulus at 300 % elongation (kg/cm$^2$), DIN 53 504, sheet 2 |
| 3) Heating time $t_{90}$ (min) | Time required to reach 90% of the maximum stress value at 300% elongation at the given temperature*) |
| 4) R | Resistance to reversion in % calculated as follows: $R = \dfrac{M\ 300\ \text{after}\ 30'/170°C\ *)}{M\ 300\ \text{maximum at}\ 150°C} \times 100$ |
| 5) F | Ultimate tensile strength (kg/cm$^2$) DIN 53 504, standard ring R I |
| 6) D | Elongation at break (%) DIN 53 504, sheet 1, standard ring R I |
| 7) H | Hardness (Shore A), DIN 53 505, Range A, 4 mm slabs |
| 8) E | Rebound (%) DIN 53 512, 4 mm slabs |

*) According to the leaflet "Die Vulkanisationsbeschleuniger der Sulfenamidklasse", pages 111 – 113, published by Farbenfabriken Bayer AG

Example 1

Natural rubber, 45 phr of furnace black M 330, 2.35 phr of sulphur (Test formulation No. 1)

| Accelerator | Dose (phr) | Modulus maximum[2] (M 300, kg/cm$^2$) at 150°C | at 160°C | Heating time[3] (min) $t_{90}$ at 150°C | 160°C | Resistance to reversion[4] (%) at 150°C | 160°C |
|---|---|---|---|---|---|---|---|
| A | 0.3 | 123 | 114 | 20 | 12.5 | 96 | 87 |
| CBS | 0.5 | 122 | 116 | 11 | 6.0 | 86 | 75 |

CBS = N-cyclohexyl-benzothiazole-2-sulphenamide

Example 2

Natural rubber, 45 phr of furnace black N 330, 2.35 phr of sulphur (test formulation No. 1)

| Mixture No. | Vulcanization accelerator | Dose (phr) | Scorch time[1] at 120°C (min) | Modulus maximum[2] at 150°C (M 300) (kg/cm$^2$) | Heating time[3] ($t_{90}$) at 150°C (min) | F[5] | D[6] | H[7] at $t_{90}$/150°C | E[8] |
|---|---|---|---|---|---|---|---|---|---|
| 1 | MBTS = dibenzothiazyl disulphide | 0.5 | 16 | 100 | 11 | 230 | 550 | 58 | 49 |
| 2 | A MBTS | 0.25 0.25 | 22 | 142 | 9 | 265 | 530 | 62 | 51 |
| 3 | A | 0.5 | 25 | 147 | 15 | 255 | 510 | 60 | 51 |
| 4 | MBT = 2-mercaptobenzothiazole | 0.5 | 9 | 116 | 8.5 | 240 | 540 | 58 | 48 |
| 5 | A MBT | 0.25 0.25 | 15 | 147 | 9.0 | 265 | 540 | 62 | 50 |
| 6 | A | 0.5 | 21 | 159 | 13.5 | 270 | 500 | 62 | 50 |
| 7 | MBTS DPG = diphenylguanidine | 0.25 0.25 | 13 | 111 | 10 | 235 | 550 | 59 | 49 |

Example 3

Natural rubber, 45 phr of furnace black N 330, 2.35 phr of sulphur (Test formulation No. 1)

| Mixture No. | Vulcanization accelerator | Dose (phr) | Scorch time[1] at 120°C (min) | Modulus maximum[2] at 140°C (kg/cm²) | Heating time[3] ($t_{90}$) at 140°C (min) |
| --- | --- | --- | --- | --- | --- |
| 8 | MBTS | 0.6 | 7 | 133 | 12 |
|   | DPG | 0.4 |   |   |   |
| 9 | A | 0.1 |   |   |   |
|   | MBTS | 0.1 | 11 | 142 | 9 |
|   | TMTD | 0.2 |   |   |   |

Example 4

Natural rubber, 45 phr of furnace black N 330, 1.2 phr of sulphur (Test formulation No. 1)

| 10 | MBTS | 0.5  | 27 | 82  | 11 |
| -- | ---- | ---- | -- | --- | -- |
| 11 | MBTS | 0.25 | 38 | 111 | 15 |
|    | A    | 0.25 |    |     |    |
| 12 | A    | 0.5  | 40 | 113 | 19 |

Example 5

Styrene-butadiene rubber, 45 phr of furnace black N 330, 1.8 phr of sulphur (Test formulation No. 2)

|  | Mixture No. 13 | Mixture No. 14 |
| --- | --- | --- |
| Vulcanization accelerator (phr) | CBS 1.0 | MBTS 0.20 |
|  |  | A 0.20 |
|  |  | TMTD 0.07 |
| Scorch time[1] at 120°C (min) | 55 | 45 |
| Modulus-maximum[2] at 150°C (kg/cm²) | 102 | 102 |
| Heating time $t_{90}$[3] at 150°C (min) | 20.5 | 20 |

CBS = N-cyclohexyl-benzothiazyl-2-sulphenamide
MBTS = dibenzothiazyldisulphide
TMTD = tetramethylthiuramic disulphide

What we claim is:

1. A vulcanization accelerator composition comprising
   a. 0.02 to 5 parts by weight of at least one 1,3,5-triazine disulphide of the formula

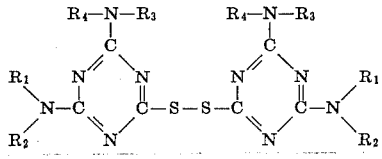

in which one of the groups $R_1$ to $R_4$ is a hydrogen atom and the remainder, which may be the same or different, are alkyl having 1 to 4 carbon atoms, and
   b. 0.05 to 5 parts by weight of at least one mercapto accelerator.

2. The composition as claimed in claim 1 containing
   c. up to 4 parts by weight of at least one thiuramic accelerator.

3. The composition as claimed in claim 1 in which (b) is dibenzothiazyl disulphide, 2-mercaptobenzothiazole or the zinc salt of 2-mercaptobenzothiazole.

4. The composition as claimed in claim 2 in which (c) is tetramethyl thiuram sulphide, tetraethyl thiuram disulphide, tetramethyl thiuram monosulphide or dimethyl diphenyl thiuram disulphide.

5. The composition as claimed in claim 1 in which (a) is bis-(2-ethylamino-4-diethylamino-triazinyl-6) disulphide.

6. The composition as claimed in claim 5 in which (b) is dibenzothiazyl disulphide.

7. The composition as claimed in claim 2 in which (c) is tetramethyl thiuram disulphide

* * * * *